United States Patent
Kellner

[11] 3,827,061
[45] July 30, 1974

[54] FOCUSING LENS LOCK FOR PHOTOGRAPHIC CAMERAS

[76] Inventor: Ferdinand Kellner, 8941 Hart 14, near Memmingen, Germany

[22] Filed: June 20, 1973

[21] Appl. No.: 371,690

[30] Foreign Application Priority Data
July 25, 1972  Germany............................ 2236344

[52] U.S. Cl.................. 354/195, 354/191, 354/269
[51] Int. Cl. ............................................ G03b 3/02
[58] Field of Search ......... 95/45, 46, 44 R; 352/140

[56] References Cited
UNITED STATES PATENTS 1,274,561  8/1918  Kroedel ................................. 95/46
3,324,781  6/1967  Clos ...................................... 95/45
3,442,576  5/1969  Weiner .................................. 95/45

Primary Examiner—Samuel S. Matthews
Assistant Examiner—E. M. O'Connor
Attorney, Agent, or Firm—Holman & Stern

[57] ABSTRACT

In a photographic apparatus with manually-operable means for rapid focusing of the objective lens, the invention has been devised to provide for automatic retention of the correctly-set objective in response to the operation of the shutter trip of the camera. In a preferred form, actuation of the shutter trip also operates locking means acting on an element movable with the objective.

7 Claims, 4 Drawing Figures

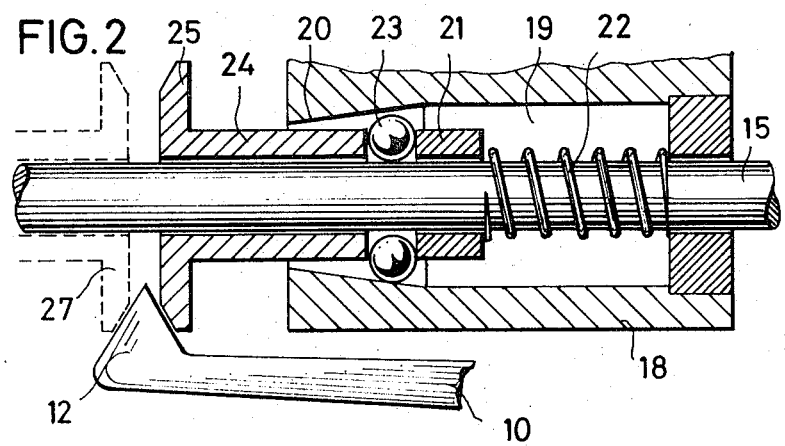
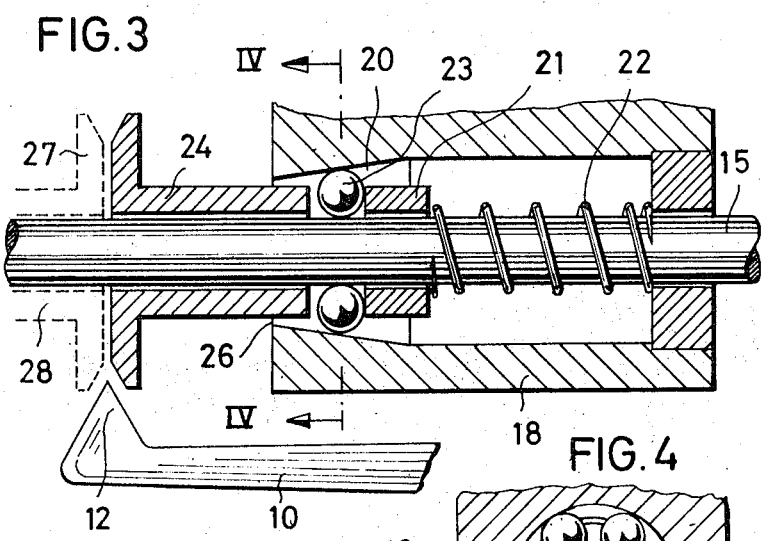
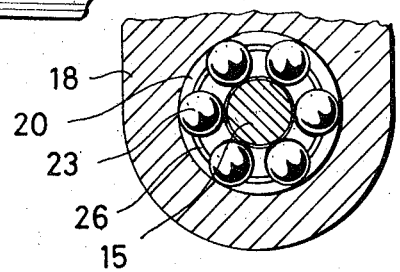

FOCUSING LENS LOCK FOR PHOTOGRAPHIC CAMERAS

This invention relates to an apparatus for photographic cameras of the kind having an objective, or parts thereof, readily movable for the purpose of quick focusing.

There are known reflex cameras which are provided with rapid-focusing objectives constructed in such a way as to allow the focusing to be quickly performed. The sharp focusing of the lens-carrying part of the objective is performed, in particular, through the agency of a contractible grip or some other form of handle, against the action of a restoring force. In special cases the arrangement is so devised that the grip or handle can be enveloped in the hand.

It has been found that sharp focusing can be quickly and readily performed in this way. This accurate focusing has to be maintained until the shutter of the camera is tripped and in many cases experience is that the sharp focusing is lost in the period between the moment at which the user recognises it and the moment at which the photograph is taken. If the mirror of the reflex camera swings away there is a dark pause during which the sharp focusing is not controlled. Less-experienced users are also inclined to vary the pressure with which the hand-grip or the like is held during the moment at which the shutter is released, and this action can produce faults in the sharp focusing.

In the case of small depth of focus of long focal length lenses a very small deflection is sufficient to spoil the definition of the photograph and make it useless. A particular difficulty here lies in the fact that the cause of the non-sharp definition of the photograph is not later recognised and the blemish is frequently blamed on the camera, whereas it was due to faulty operation. A fixing means, a clamping device or the like, for avoiding operating faults of this character used before the shutter is operated, does not product satisfactory results. The advantages of a rapid-focusing arrangement are lost when, although the focusing is effected quickly, further manipulations are necessary to fix this focusing. Frequently a solution of this character is inhibited by the fact that fixing of the kind indicated cannot be performed; in the case, for example of moving objects the distance of which varies. In addition to all this it has to be noted that as a general rule the focusing device is activated by one hand of the user, whilst the shutter trip is operated by the other hand. Attempts, for example, to operate the sharp focusing device by the thumb of the user often break down because accurate focusing can be lost during the operation of the fixing device.

In the case of cameras in which the focusing is performed in ways other than through a hand grip or other means which can be compressed against the action of a restoring force, there are similar fundamental difficulties in having the lens-carrying part of the objective guided for ready movement for the purpose of rapid focusing.

In other and comparable cameras the focusing is performed through the agency of a screwed spindle or similar means. Admittedly in cameras of this kind the danger of an unintentional alteration of the set distance at the moment the shutter of the camera is tripped is notably less because the adjusting mechanism produces a type of self-locking. The method of adjustment of the lens-carrying part of the objective involves however a very troublesome, laborious, and time-consuming servicing of the camera so that many pictures, and particularly photographs which rely on rapid focusing, cannot be taken.

It is an object of the invention to device a apparatus for the purpose indicated above which will eliminate faulty photographs as a result of unintentional variation of the sharp focusing.

To this end the present invention resides in a photographic apparatus comprising a camera, a long focal length objective of which at least a part is movable relatively to said camera for focusing purposes, a hand grip coupled to said objective for adjusting the same for focusing, and a trigger for operating the shutter of said camera, having the improvement wherein the aforesaid hand grip has associated therewith a device movable in sympathy therewith during focusing, and means are provided for locking said device against movement in response to tripping operation of said trigger.

The invention is based on the principle that the hand which sets the focus is not in a position to operate other additional devices to fix the setting, or for like purposes. It is only when the hand which operates the focusing device is kept solely for this purpose that an exact and accurate focusing is possible.

But the other hand which operates the trip (which may be in the form of a trigger) cannot perform additional fixing functions if a useful result is to be achieved. The present invention has provided an unexpected solution to this problem. It is that the operation of the fixing device is performed by the trigger itself and the user is not given this further duty. Faulty operation is thereby excluded. Pressure on the trigger temporarily fixed the required focusing and the operation of the camera shutter immediately follows. Finally, the trigger is again released. As a rule the user will not notice the additional operating step in relation to known cameras. It is possible, using the means described, to follow subjects the distance of which is changing and even so to obtain sharp photographs.

This invention can be implemented practically in various ways. The power required to fix the lens-carrying part of the objective can be produced mechanically. Alternatively, other sources of energy can be used; for example the trigger can be used to operate electrical switches which control fixing magnets or other devices. In particular the invention proposes a mechanical construction in which the fixing devices comprises two symmetrically-arranged bodies, one of which prohibits the movement of the objective, or objective part, in one direction and the other of which precludes the movement in the other direction. Splitting the fixing device into two bodies procures substantial advantages as regards the anchoring effect relatively to the operating force which has to be applied.

It is of an advantage if wedge means or other kinds of locking means acting between wedge surfaces, are used.

These and other features of the invention are disclosed in the following description of an example of embodiment thereof which is illustrated diagrammatically in the accompanying drawings. In these drawings:

FIGS. 2 and 3 are enlarged illustrations of details of the arrangement in accordance with the invention, and FIG. 4 is a section through the illustration in FIG. 3, taken on the line IV — IV.

Figure 1:
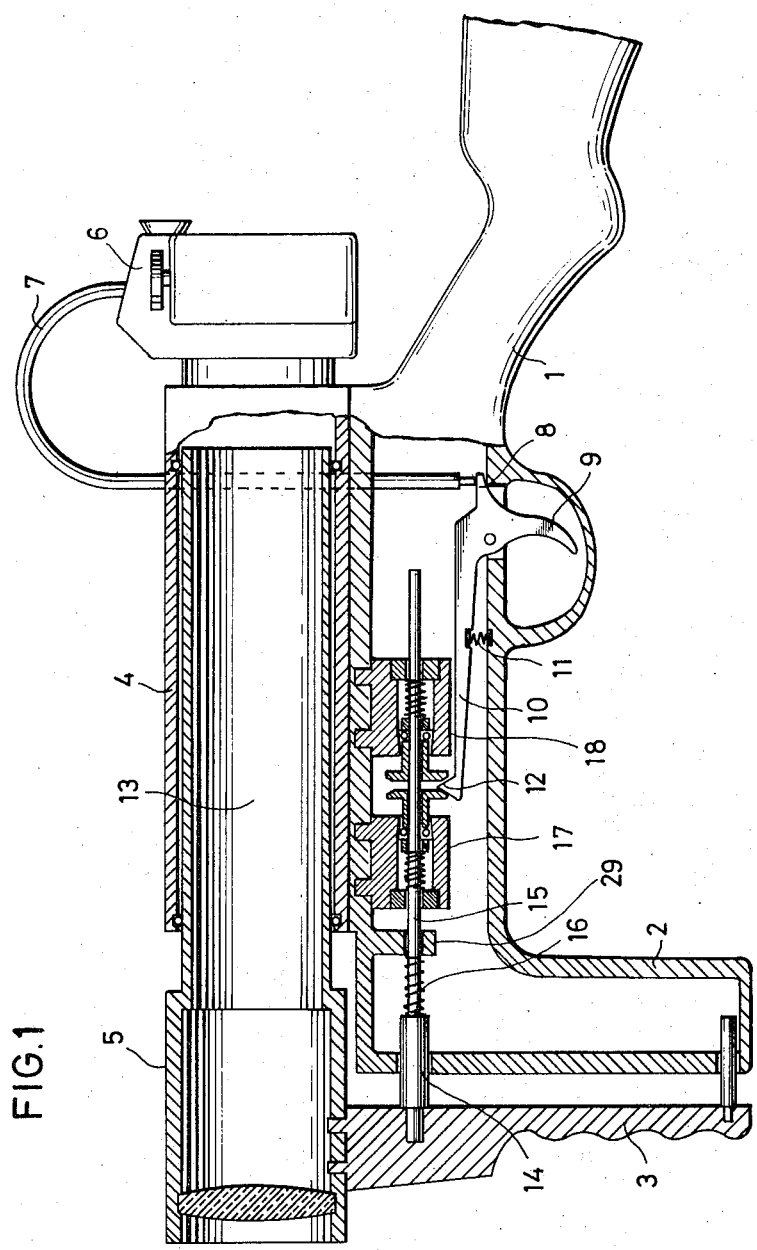
FIG. 1 is a section through a photographic camera with a rapid focusing arrangement and a focus-fixing device in accordance with the invention.

In the drawings the apparatus in which the invention is applied comprises a frame 1 with a hand grip made up of the parts 2 and 3, this hand grip being contractible against the action of a spring 16 guided on rod 15 and applied at one end against an enlargement 40 and at the other end against a guide lug 29 for the rod. The part 3 of the hand grip carries the objective 5, which is displaceable in the tube 4. The camera 6 is secured to the frame 1, or to the tube 4, and the wire shutter-release cable 7 can be operated from a finger 8 on the trigger 9. The optical axis of the system is designated 13.

The fixing device here comprises bodies 17 and 18 arranged in the frame 1, which is hollow. These bodies 17 and 18 are disposed symmetrically in relation to one another and are alike in other respects. They both act on rod 15. Details are shown in FIGS. 2 to 4, which depict the body 18.

Internally the body 18 has a conical inner wall 20 against which balls 23 are pressed under the action of a spring 22, a sleeve 21 being interposed between the balls 23 and the spring 22 inside opening 19 to obtain a uniform movement of the balls. In addition a bush 24 is applied against the balls 23, this having a collar 25 which co-operates with a wedge 12 on a lever 10 associated with the trigger. The bush 24 has an outer diameter which is less than the minimum diameter of the conical inner wall 20, leaving a gap 26 between these parts which caters for free movement.

When a comparison is made between the position of the parts in FIGS. 2 and 3 it is clear that when the wedge 12 of lever 10 engages between the collar 25 and the collar 27 of the two adjacent bodies, under the action of spring 11 (FIG. 1), the balls 23 are moved into an inoperative position, the spring 22 being compressed. In this condition the hand grip parts 2 and 3 can be pressed together without this having any effect on the fixing device. When exact focusing has been set and the trigger 9 operated, the wedge 12 will release the two bushes 24 and 28 and springs 22 will push the balls 23 into a locking position. Rod 15 is held fast and no longer movable. When the trigger is moved further the finger 8 actuates the wire cable 7 and trips the reflex camera. When the trigger is released the fixing device is also released.

The arrangements in accordance with the invention can be modified in various ways. In particular it is advantageous if the rod 15, when required, is used for other purposes. If this rod is of appropriate strength it may for example perform a supporting function and be used for mounting and guiding the objective 5 in the tube 4.

I claim:

1. In a photographic apparatus comprising a camera having a shutter, a long focal length objective lens of which at least a part is movable relatively to said camera for focusing purposes, a hand grip coupled to said objective lens for adjusting the same for focusing, and a trigger having an operative position for operating the shutter of said camera and an inoperative position, the improvement comprising a device operatively connected to the objective lens and movable along with the handgrip during focusing, and means provided for locking said device against movement in response to movement of said trigger to its operative position.

2. Photographic apparatus according to claim 1, in which said device comprises a longitudinally movable member, and the locking means comprise two clamping devices acting symmetrically on said longitudinally movable member to lock it against movement upon movement of said trigger to its operative position.

3. Photographic apparatus according to claim 2, in which each clamping device comprises a hollow body including a tapered wall and having therein a set of balls and spring means, said balls being movable by said spring means into wedging engagement with said tapered wall of said body, and having a plunger element acting on said balls from the opposite side thereof to the spring means for moving them from wedging engagement with said tapered wall when said trigger is in its inoperative position.

4. Photographic apparatus according to claim 3, in which the longitudinally movable member is a rod coupled to said hand grip and slidable in a guideway in the apparatus and through said two clamping devices said clamping devices being disposed symmetrically in the apparatus with their plunger elements side by side, and the aforesaid trigger includes an arm and a wedge carried by said arm, said wedge engages between said plunger elements to keep them apart when the trigger is in its inoperative condition, said wedge being moved, when the trigger is moved to operate the shutter of the camera, to thereby to release the plunger elements and allow the respective sets of balls in the clamping devices to move into locking position and hold the said rod and the objective fixed.

5. Photographic apparatus according to claim 4, in which each of the plunger elements is in the form of a bush with an enlarged head, and the wedge is disposed between the heads of the opposed plungers when the trigger is in its inoperative position.

6. Photographic apparatus according to claim 5, in which the set of balls in each clamping device is urged in the clamping direction by a spring acting thereon through a thrust-balancing sleeve.

7. Photographic apparatus according to claim 6, which comprises a hollow frame in which the locking means and a portion of the trigger are disposed, this frame having a depending portion serving as a part of the hand grip.

* * * * *